(12) United States Patent
Yeomans

(10) Patent No.: US 6,401,834 B1
(45) Date of Patent: Jun. 11, 2002

(54) EARTH WORKING TOOL ASSEMBLY

(76) Inventor: Allan James Yeomans, 60 Sunrise Boulevard, Surfers Paradise, QLD 4217 (AU)

( * ) Notice: Subject to any disclaimer, the term of this patent is extended or adjusted under 35 U.S.C. 154(b) by 0 days.

(21) Appl. No.: 09/612,701

(22) Filed: Jul. 10, 2000

(51) Int. Cl.$^7$ ............................................... A01B 13/08
(52) U.S. Cl. ..................................... 172/701.3; 37/446
(58) Field of Search ........................ 37/446, 456, 452; 172/699, 700, 750, 713, 721, 730, 753, 765, 769–772.5, 266, 719, 701.2, 701.3

(56) References Cited

U.S. PATENT DOCUMENTS

| | | | | |
|---|---|---|---|---|
| 4,129,934 A | * | 12/1978 | Gettman | 29/427 |
| 4,333,536 A | * | 6/1982 | Ryan | 172/721 |
| 4,762,184 A | | 8/1988 | Yeomans | |
| 4,932,478 A | * | 6/1990 | Jones | 172/699 |
| 5,027,535 A | * | 7/1991 | Maguina-Larco | 37/452 |
| 5,152,087 A | * | 10/1992 | Maguina-Larco | 37/452 |
| 5,195,597 A | | 3/1993 | Yeomans | |
| 5,415,236 A | * | 5/1995 | Williams | 172/699 |
| 5,605,196 A | * | 2/1997 | Grimm et al. | 172/266 |
| 5,988,291 A | | 11/1999 | Yeomans | |

* cited by examiner

Primary Examiner—Robert E. Pezzuto
(74) Attorney, Agent, or Firm—Wood, Phillips, Katz, Clark & Mortimer

(57) ABSTRACT

An earth working tool assembly of the type including a tool shank terminating in a foot and an earth working tool or point which has a socket for engagement by the shank foot. A bridging member extends between the shank foot and point, the bridging member having a tongue at one end which is received in a channel on the underside of the shank foot and a channel at the other end which receives a rib on the underside of the point. The bridging member transfers a proportion of side loading on the tool point to the tool shank at a position rearwardly from the leading end of the foot of the tool shank so as that the shank has increased resistance to breakage or bending.

16 Claims, 5 Drawing Sheets

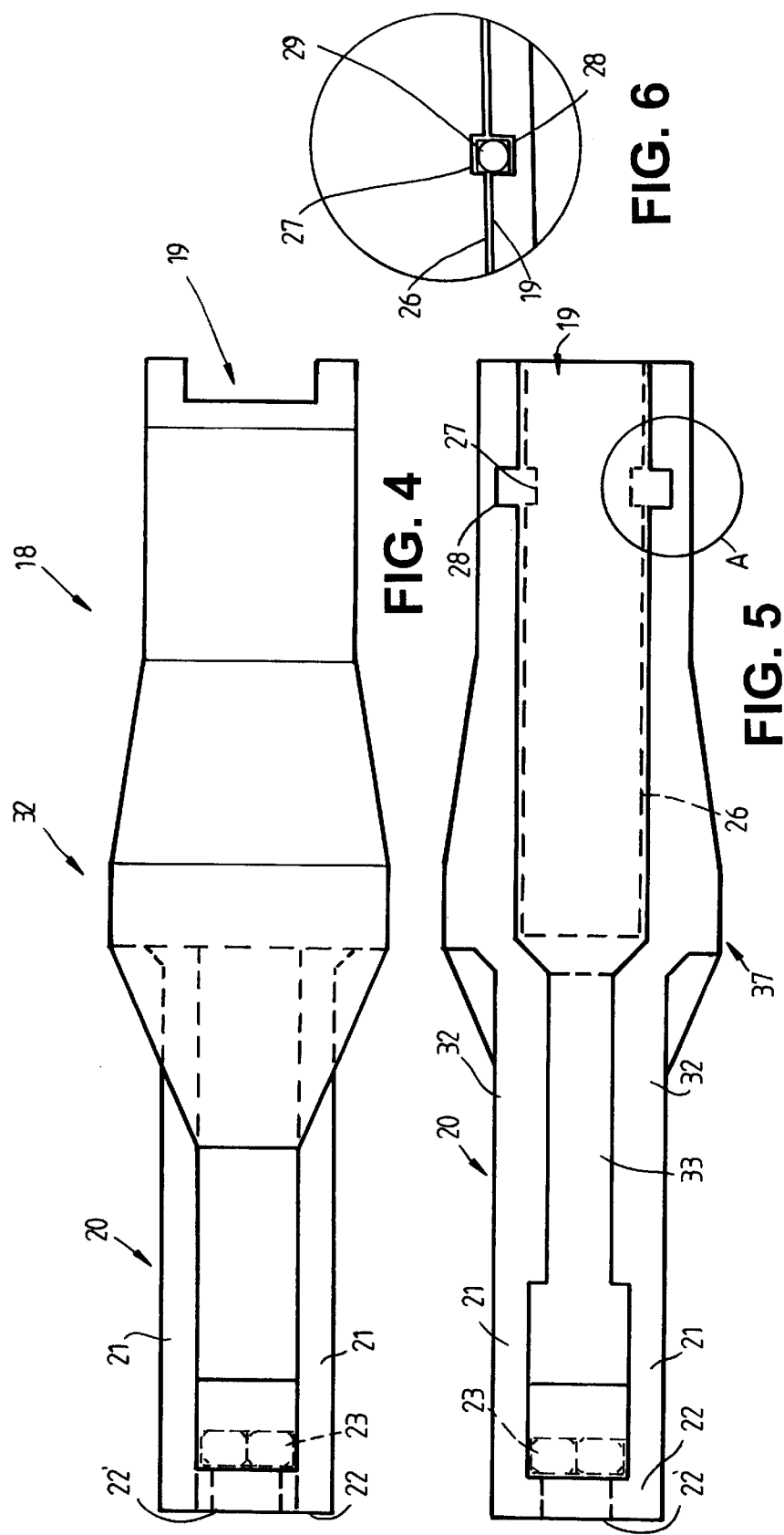

EARTH WORKING TOOL ASSEMBLY

TECHNICAL FIELD

This invention relates to an earth working tool assembly and in particular to a method and means for reinforcing the shank of an earth working tool to increase the resistance of the tool shank to side loadings on the tool point attached to the tool shank.

BACKGROUND ART

Many earth working tools as used in agricultural equipment include a shank which is provided at its lower end with a replaceable or detachable point for penetration of the earth being worked by the tool. So as to reduce disturbance of the earth, the tool shank is usually made relatively narrow in width at least adjacent to its lower end. As a result side loadings applied through engagement of the tool point with the earth and meeting obstructions during ploughing or other earth working can cause bending of and thus damage to the tool shank. In some cases, the tip of the tool shank can be broken off.

A further consequence is that the tool point can become detached from the tool shank. This may arise because the tool points usually include a rearwardly directed socket for engagement with the tool shank tip which is partially split on its underside and excessive ride loading on the tool point can cause the socket to expand and the point to become loose.

Whilst the above disadvantages can be overcome by increasing the width of the tool shank, this has an adverse effect on ploughing or other earth working operations. Similar disadvantages occur if the tool shank is reinforced on one or both sides.

SUMMARY OF THE INVENTION

The present invention aims to overcome or alleviate one or more of the above disadvantages by providing a method of, and means for, reinforcing a tool shank of an earth working tool which will function to improve the capabilities of the earth working tool. The present invention in a further aspect aims to provide an improved arrangement for retaining an earth working tool point to a tool shank. Other objects and advantages of the invention will become apparent from the following description.

The present invention thus provides in a first aspect an earth working tool assembly comprising:

a tool shank having a front end;

an earth working point having a rear end detachably engaged with said front end of tool shank; and load transferring means extending from the rear end of said point and engaging said tool stank at a position rearwardly of said front end thereof to transfer at least a proportion of the side loadings on the tool point to the shank at said position rearwardly of said front end.

The tool shank and point have lower or under sides and preferably, the load transferring means is engaged with the lower or under sides of the shank and point so as not to substantially increase the width of the tool shank. Typically, the shank has a lower foot portion for engagement with the tool point, the foot portion extending forwardly of the main leg of the shank and the tool point has a socket for complementary receipt of the foot portion of the shank. Alternatively, the shank may have at its lower end a socket for receipt of the tool point, the point for this purpose having a rear part for complementary engagement in the socket of the tool shank.

The load transferring means may be formed integrally with the tool point however preferably, the load transferring means comprises a separate bridging member which connects both with the tool point and shank. Preferably, the bridging member is slidably engaged with the shank. Complementary male/female engagement means are preferably provided between the bridging member and point and shank. The complementary male/female engagement means between the tool point and bridging member may comprise a longitudinally extending rib on the underside of the point and a channel in the bridging member for complementary receipt of the rib. Keying means may be provided for keying the point to the bridging member. The keying means suitably comprises opposite recesses in the rib of the tool point and the channel of the bridging member, the recesses being aligned with a key extending into both recesses, the key preventing longitudinal movement between the rib and channel.

The complementary male/female engagement means between the tool shank and bridging member may comprise a channel on the lower side of the shank and a complementary tongue on the bridging member slidably receivable in the shank channel. Connecting means may be provided for positively securing the bridging member to the tool shank. The connecting means suitably comprise a nut and bolt connection between the tongue of the bridging member and the channel of the tool shank. The nut and bolt connection may comprise a nut captured against rotational movement in the tongue of the bridging member, and a bolt supported to the shank and extending into the channel for engagement with the nut. Preferably, the channel includes an end wall through which the bolt passes for engagement with the nut whereby tightening of the bolt draws the tongue along the channel.

Preferably, the bridging member has a region of increased sectional modulus between the tongue and channel of the bridging member for providing effective support to the shank.

In a further aspect, the present invention provides a method of reinforcing the shank of an earth working tool of the type having a point detachably engaged therewith, said shank having a front end, and said point having a rear end engaged with said front end of said shank, said method including the steps of:

providing load transferring means, said load transferring means extending from the rear end of said point; and connecting said load transferring means to said shank at a position rearwardly from said front end of said shank whereby a proportion of side loadings on said point is transferred to said shank rearwardly of said front end thereof.

In yet a further aspect, the present invention provides a tool point adapted for engagement with a tool shank, said point having a rear end engageable with a front end of said tool shank and a lower side; said point having:

means on said lower side thereof adapted to engage a load transferring member connectable to said tool shank for transferring at least portion of the side loadings on said tool point to said shank at a position rearwardly of said front end.

Suitably the means on the lower side of the point comprises longitudinally extending rib means for engagement by the load transferring members. Preferably, the shank has means on the underside thereof for engagement by a loading transferring member. The means on the underside of the shank may comprise a channel for receipt of the load-transferring member.

Alternatively, the means on the lower side of the point may comprise a channel for receipt of the load transferring member and the means on the lower or underside of the shank may comprise rib means for engaging the load-transferring member.

Preferably the rib on the point and channel on underside of the shank are cast in steel integrally with the point and shank respectively however they may be separately attached such as by welding. The bridging member is also suitably comprise a metal casting however it may be fabricated from steel or other metal.

BRIEF DESCRIPTION OF THE DRAWINGS

In order that the invention may be more readily understood and put into practical effect, reference will now be made to the accompanying drawings which illustrate a preferred embodiment of the invention and wherein:

FIGS. 4 and 5 illustrate the lower and upper sides of the bridging member respectively;

FIG. 6 is an enlarged view of the region A of FIG. 5 showing the keying arrangement between the bridging member and tool point;

DETAILED DESCRIPTION OF THE PREFERRED EMBODIMENT

Figure 1:
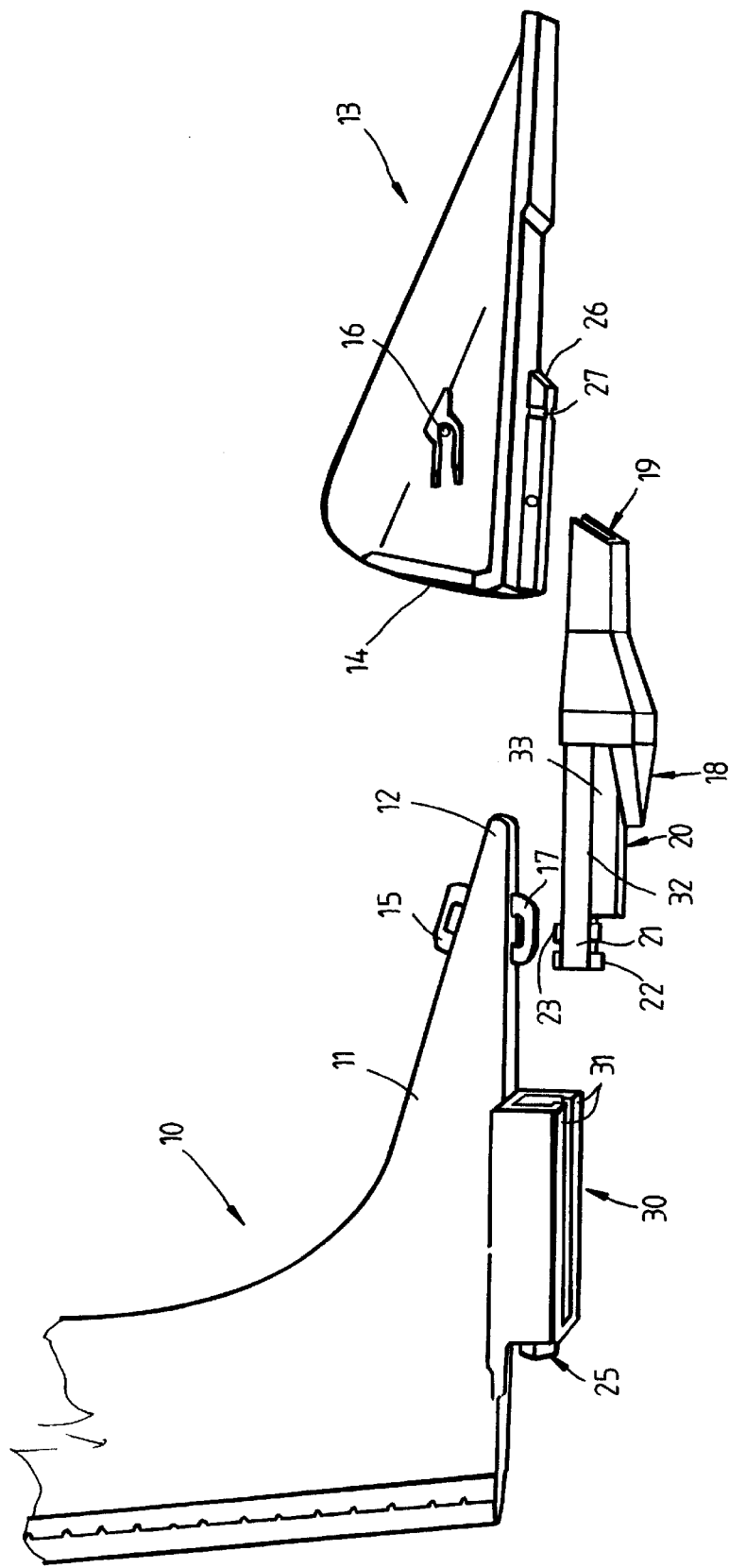
FIG. 1 illustrates in a disassembled attitude an earth working tool assembly comprising a tool shank, tool point and bridging member according to an embodiment of the invention.
Figure 8:
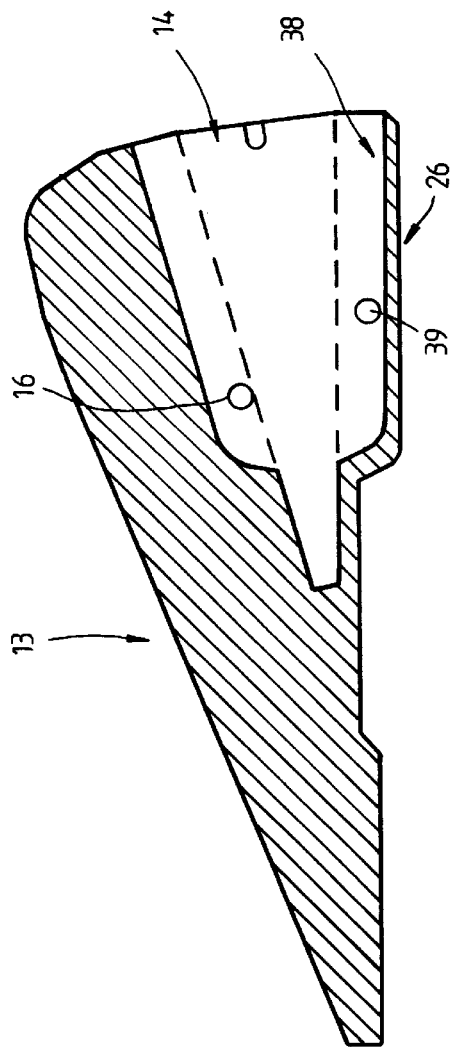
FIG. 8 is a sectional view of the tool point along line B—B of FIG. 7.

Referring to the drawings and firstly to FIG. 1, there is illustrated an earth working tool shank 10 provided at its lower end with an integrally formed forwardly directed foot 11 which tapers to a loading end 12. Adapted for engagement with the tool shank 10 is a earth working point 13 which is provided in its rear end with a hollow socket 14 (see also FIGS. 2 and 8) which is substantially complementary to, so as to receive the foot 11 of the shank 10. To retain the point 13 to the tool shank 10, the foot 11 of the tool shank 10 is provided at least on its upper side with an apertured lug 15 and the point 13 is provided in opposites sides with aligned openings 16 through which a wire or other similar member may be passed. When the point 13 is fully engaged with the foot 12, the apertured lug 15 is aligned with the openings 16 so that the wire may be passed therethrough and turned over on opposite sides to lie against the point 13 to positively secure the point 13 to the foot 12. A similar apertured lug 17 is provided on the underside of the foot 11 such that the point 13 may be reversed in attitude and secured to the shank foot 11 in a similar manner to that described above by a wire or other similar member passed through the openings 16 and aligned apertured lug 17. Alternatively, the apertured lugs 15 and 17 may be replaced by simple unapertured lugs which act as stops behind which the retaining wire or other member passed through the openings 16 may be located. Such an arrangement is similar to that disclosed in my Australian patent No. 702343.

To transfer a proportion of the side loadings applied to the tool point 13 to the tool shank 10 at a position rearwardly of the leading end 12 of the foot 11, a bridging member 18 is provided to extend between the point 13 and shank 11 on the underside thereof. The bridging member 18 as also shown in FIGS. 4 and 5 includes at one end a longitudinally extending channel 19 and at its opposite end with a longitudinally extending tongue 20, the tongue 20 being bifurcated at its free outer end to form spaced arms 21 joined by an end wall 22. A nut 23 is arranged to be located between the arms 21 and is of such as size as to be captured between the arms 21 so as to be non-rotatable relative thereto. The end wall 22 is provided with an opening 22' through which the threaded shank 24 of a bolt 25 (see FIG. 3) may be passed for engagement with the nut 23 as described further below.

Figure 3:
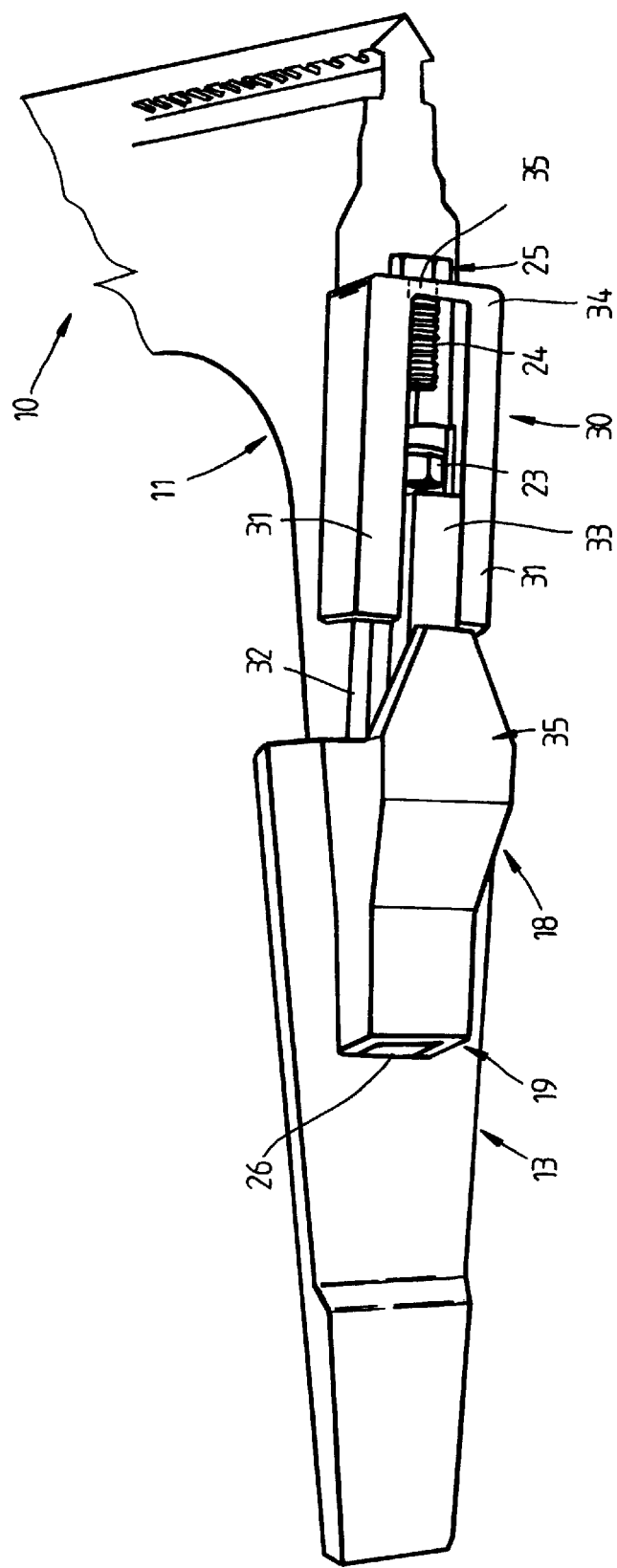
FIG. 3 illustrates from the underside, the assembly of the tool shank, tool point and bridging member.

The point 13 is provided on its underside with a longitudinal extending rib 26 which has a width slightly less than the width of the channel 19 of the bridging member 18 so that it may be nearly received therein as shown in FIG. 3 and in dotted outline in FIG. 5. The rib 26 spans the normally split underside of the point socket 14 so that the socket 14 is substantially closed other than at its entrance. The rib 26 includes rectangular sectioned notches or recesses 27 in its opposite side walls and the channel 19 is provided with corresponding rectangular notches or recesses 28 on its inner side walls. The rib 26 may be located in a position relative to the channel 19 such that the recesses or notches 27 and 28 are opposed to each other as shown in FIG. 5. In this position, opposite keys 29 may be located in the opposing notches 27 and 28 as shown in FIG. 6, the keys 29 spanning the recesses 27 and 28 to thereby prevent longitudinal movement between the rib 26 and channel 19 but permitting movement of the rib 26 transversely in a direction parallel to the keys 29 out of the channel 19. The keys 29 as shown may comprise cylindrical members or alternatively the keys 29 may be of other cross sectional forms such as a rectangular or square.

The shank foot 11 (see FIGS. 1 to 3) is provided on its underside with a channel 30 extending longitudinally of the foot 11, the channel 30 being open in a direction towards the leading end 12 of the foot 11 so as to be capable of slidably receiving the tongue 20 of the bridging member 18. The channel 30 includes opposite reentrant flanges 31 such that when the tongue 20 is slid into the channel 30, it is captured and prevented from other than longitudinal sliding movement relative to the channel 30. The tongue 20 includes a portion rearwardly of the separated arms 21 of T-shaped form in cross-section, the arms 32 of which are located beneath the channel flanges 31 and the leg 33 of which projects outwardly between the flanges 31 in use as shown in FIG. 3. The channel 19 also includes an end wall 34 having an opening 35 therein through which the bolt shank 24 passes. In use the head of the bolt 25 abuts the wall 34.

Figure 2:
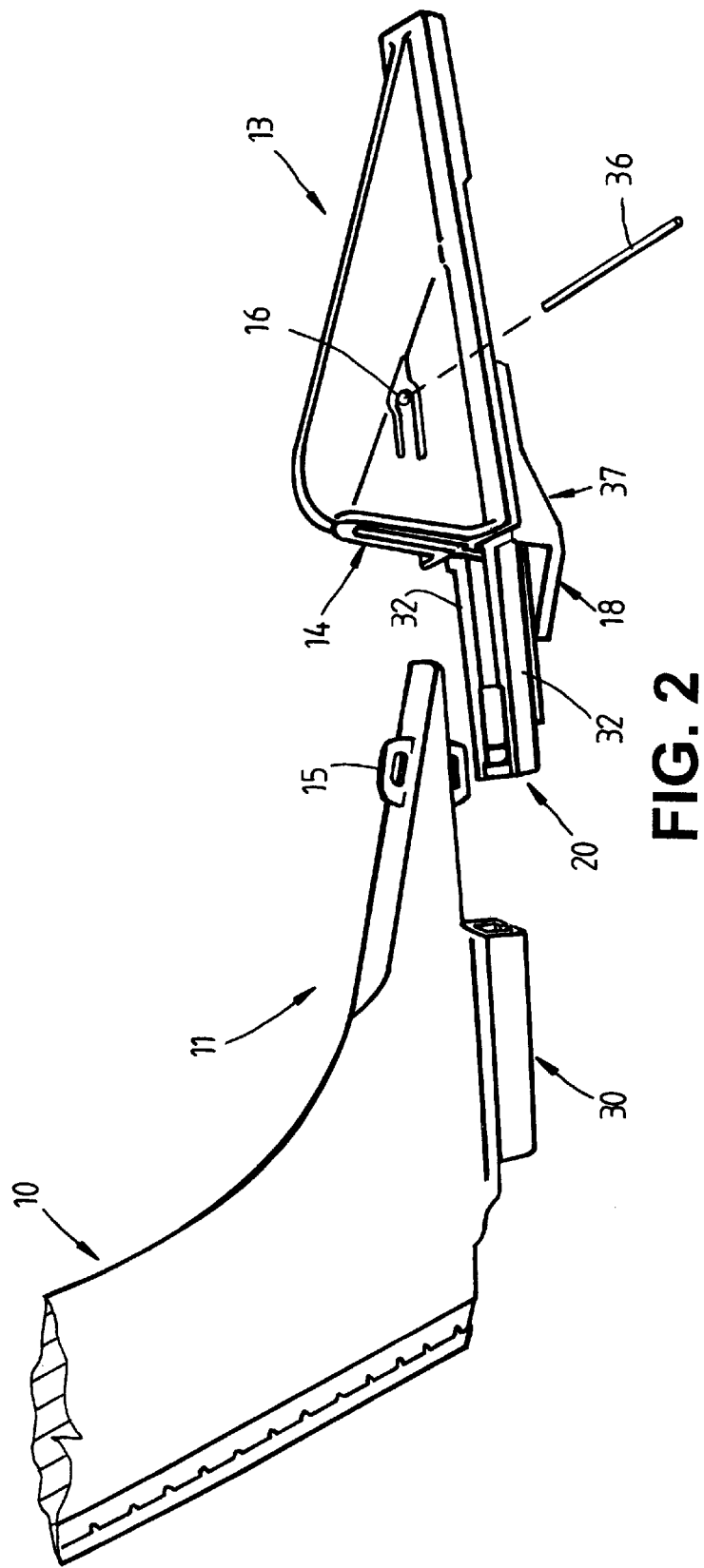
FIG. 2 illustrates the bridging member engaged with the point prior to assembly with the tool shank.

In the partly assembled position shown in FIG. 2 prior to engagement of the point 13 with the shank 10, the point rib 26 is placed within the channel 19 of the bridging member 18 and keyed thereto using the keys 29. The tongue 30 is then slid longitudinally into the channel 30 on the underside of the shank foot 11 as shown in FIG. 3 and the shank foot 11 inserted into the point socket 14 until the opening 16 is aligned with the apertured lug 17. A retaining wire 36 may then be passed through the openings 16 and lug 17 and turned over at opposite ends to retain the point 13 to the foot 11.

Further positive retention of the bridging member 18 is provided by the connection between the bolt 25 and nut 23. Thus the threaded shank 24 of the bolt 25 is passed through the opening 22' to engage the nut 23 and thereafter rotation of the bolt 25 draws the bridging member 18 towards the end wall 33 of the channel 30. In the partly assembled position of FIG. 3, the point rib 26 is keyed to the channel 19, the foot 11 of the shank 10 extends into the socket 14 and the tongue 20 of the bridging member 18 is located in the channel 31. After the bolt shank 24 is threadably engaged with the nut 23, the point 13 cannot be detached from the shank 10 unless the bolt 25 and nut 23 are disconnected which will release the bridging member 18 from the shank foot 11 and allow the shank 13 to be slid longitudinally off the foot 11. Thus the bolt 25 and nut 23 can replace the wire 36 or be used in conjunction with the wire 36.

It is not however always essential to use the keys 29 to interconnected the point 13 and bridging member 18. Thus the point 13 may be solely retained to the tool foot 11 by the retaining wire 34 as described above.

The bridging member 18 thus provides additional support between the point 13 and tool shank 10 by transferring a proportion of any side loading on the point 13 to the tool shank 10 at a position rearwardly from the relatively narrow leading end 12 of the foot 11. Particularly effective support to the tool shank 10 may be achieved by forming the bridging member 18 with a region 37 having an increased section modulus intermediate the channel 19 and tongue 20.

Figure 7:
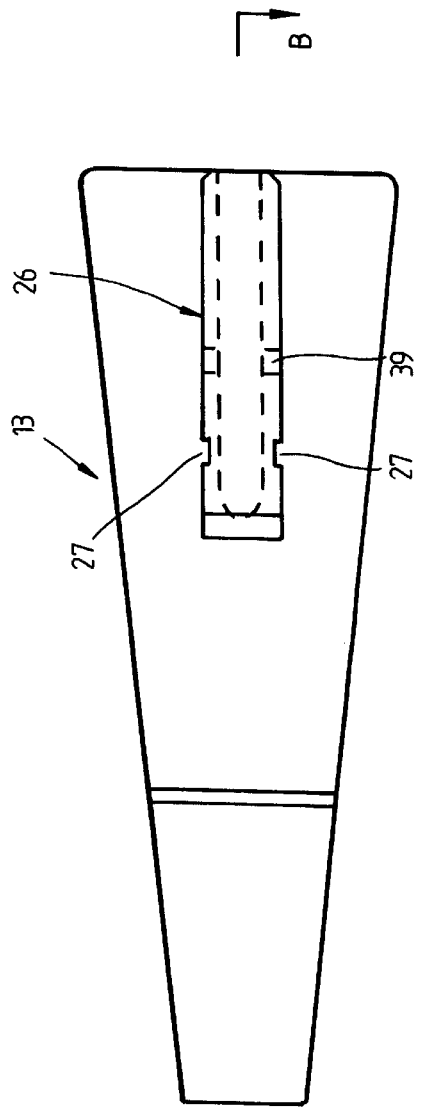
FIG. 7 is an underside view of the tool point for use in the tool assembly.

In the point 13 illustrated in FIGS. 6 and 7, the rib 23 is preferably hollow so that it defines a channel 38 to enable it to receive the lug 127 on the underside of the tool foot 11 when the point 13 is slid onto the foot 11. The rib 23 may also be provided with a transverse bore 39 through which a wire 36 may be passed and through the aperture lug 15 when the point 13 is inverted.

The modified tool shank 10 may be used with points 13 of conventional form either in the manner illustrated or inverted without the use of the bridging member 18. Further it will be appreciated that the shank 10 and foot 11 may be of many different configurations to suit the type of point used. For example, the tool foot 11 may include a female recess for complementary engagement by the rear end of the point 13. Further, the bridging member 18 may be of many different configurations other than that shown and described and the point 13 of course can be a point of any configuration to suit the type of earth working required.

It will further be appreciated that the connection arrangement between the bridging member 14 and point 13 and shank 10 may be other arrangements than that shown and described provided at least a proportion of the side loadings on the point 13 can be transferred to the shank 10 rearwardly from the leading end of the foot 15.

Whilst the above has been given by way of illustrative embodiment of the invention, all such variations and modifications thereto as would be apparent to persons skilled in the art are deemed to fall within the broad scope and ambit of the invention as herein as defined in the appended claims.

What is claimed is:

1. An earth working tool assembly comprising:
   a tool shank having a front end;
   an earth working point having a rear end detachably engaged with said front end of tool shank, said tool shank and said earth working tool having corresponding undersides;
   a bridging member located on said undersides of, and extending between, said shank and said point, complementary male/female engagement means between said point and said bridging member, said bridging member engaging said tool shank at a position rearwardly of said front end thereof to transfer at least a proportion of the side loadings on the tool point to the shank at said position rearwardly of said front end; and
   a nut and bolt connection securing said bridging member to said tool shank.

2. An earth working tool assembly as claimed in claim 1 wherein said tool shank includes an end wall on its underside through which said bolt passes for engagement with said nut whereby tightening of said nut and bolt connection draws said bridging member towards said end wall.

3. An earth working tool assembly as claimed in claim 1 wherein said bridging member has a region of increased sectional modulus between said point and tool shank.

4. An earth working tool assembly as claimed in claim 1 wherein said complementary male/female engagement means between said point and said bridging member comprises a longitudinally extending rib on the underside of said point and a channel in said bridging member for complementary receipt of said rib.

5. An earth working tool assembly as claimed in claim 4 and including keying means for keying said point to said bridging member, said keying means connecting said point to said bridging member for longitudinal movement therewith.

6. An earth working tool assembly as claimed in claim 5 wherein said keying means comprises opposite recesses in said rib of said point and keys extending from said bridging member into both said recesses.

7. An earth working tool assembly comprising:
   a tool shank having a front end;
   an earth working point having a rear end detachably engaged with said front end of tool shank, said tool shank and said earth working point having an underside;
   an elongated bridging member on the underside of, and extending between said earth working point and said tool shank;
   first means connecting said earth working point to said bridging member for movement therewith;
   second means connecting said bridging member to said tool shank, said second connecting means including means for urging said bridging member and connected earth working point longitudinally of said bridging member towards said tool shank.

8. An earth working tool assembly as claimed in claim 7 wherein complementary male/female engagement means are provided between said bridging member and said point.

9. An earth working tool assembly as claimed in claim 8 wherein said complementary male/female engagement means comprises a longitudinally extending rib on the underside of said point and a channel in said bridging member for complementary receipt of said rib.

10. An earth working tool assembly as claimed in claim 9 wherein said first connecting means comprises keying means for keying said point to said bridging member.

11. An earth working tool assembly as claimed in claim 10 wherein said keying means comprises a recess in said rib of said point and a key extending from said bridging member into said recess.

12. An earth working tool assembly comprising:
   a tool shank having a front end;
   an earth working point having a rear end, a socket connection between said front end of said tool shank and said rear end of said earth working point, said tool shank and said earth working point having an underside;
   an elongated bridging member on the underside of, and extending between, said earth working point and said tool shank;

first means connecting said bridging member to the underside of said earth working point for longitudinal movement of said tool point with said bridging member; and second adjustable connecting means connecting said bridging member to the underside of said tool shank.

13. An earth working tool assembly as claimed in claim 12 wherein said first connecting means comprises keying means between said bridging member and said tool point.

14. An earth working tool assembly as claimed in claim 13 wherein keying means comprises a recess in said tool point and a key extending from said bridging member into said recess.

15. An earth working tool assembly as claimed in claim 12 wherein said second adjustable connecting means comprises a nut and bolt connection.

16. An earth working tool assembly as claimed in claim 15 wherein said earth working point includes a wall member on its underside, said bolt and nut connection connecting said bridging member to said wall member and being adjustable to urge said bridging member and connected earth working point towards said wall member.

* * * * *